United States Patent [19]

Kasahara

[11] Patent Number: 5,424,559
[45] Date of Patent: Jun. 13, 1995

[54] SURFACE EMITTING PHOTONIC SWITCHING STRUCTURE

[75] Inventor: Kenichi Kasahara, Tokyo, Japan
[73] Assignee: NEC Corporation, Japan
[21] Appl. No.: 254,274
[22] Filed: Jun. 6, 1994
[30] Foreign Application Priority Data Jun. 11, 1993 [JP] Japan .................. 5-139699

[51] Int. Cl.⁶ ............................ H01L 27/14
[52] U.S. Cl. ...................... 257/21; 257/21; 257/85; 257/98; 257/184; 372/46; 372/50; 359/248
[58] Field of Search ............ 257/21, 17, 18, 22, 257/184, 85, 98, 84, 97, 96; 372/46, 45, 50; 359/248, 247

[56] References Cited

U.S. PATENT DOCUMENTS

| | | | |
|---|---|---|---|
| 4,845,535 | 7/1989 | Yamanishi et al. | 372/46 X |
| 4,991,179 | 2/1991 | Deppe et al. | 372/49 X |
| 5,084,894 | 1/1992 | Yamamoto | 372/50 |
| 5,157,681 | 10/1992 | Aoyagi et al. | 372/50 |
| 5,283,447 | 2/1994 | Olbright et al. | 372/48 X |

FOREIGN PATENT DOCUMENTS 63-147387  6/1988  Japan .
63-25335  10/1988  Japan .
0159980  3/1989  Japan .

OTHER PUBLICATIONS

"Continuous Wavelength Tuning of Two-Electrode Vertical Cavity Surface Emitting Lasers" Electronics Letters, 23 May 1991, vol. 27, No. 11, pp. 1002-1003.
"Photonic Switching" 1991 Technical Digest Series, Mar. 6-8, 1991, Salt Lake City, Utah, pp. 246-249.

Primary Examiner—William Mintel
Attorney, Agent, or Firm—Laff, Whitesel, Conte & Saret

[57] ABSTRACT

A surface emitting photonic switching structure includes an intermediate semiconductor structure having pn junction is sandwiched between a first semiconductor multi-layer film mirror (DBR1) and a second semiconductor multi-layer film mirror (DBR2). A pair of electrodes are provided to the intermediate semiconductor structure and the pn junction therein is applied with reverse bias voltages for changing the effective optical length of the intermediate semiconductor structure so as to change transmission wavelength of light incident on the second multi-layer film mirror or the first multi-layer film mirror. The structure can be two-dimensionally integrated, be compact and is capable of operating with low voltages.

8 Claims, 5 Drawing Sheets

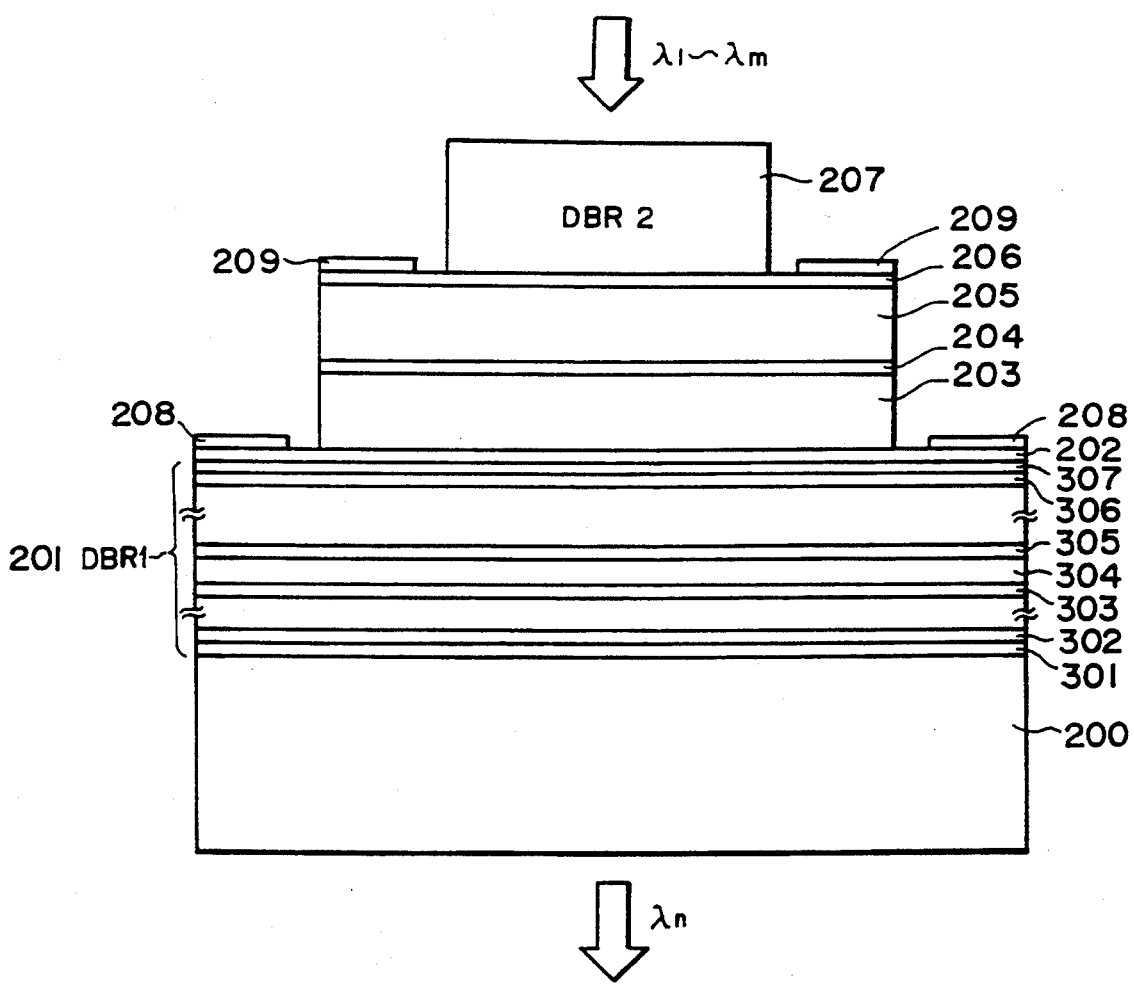

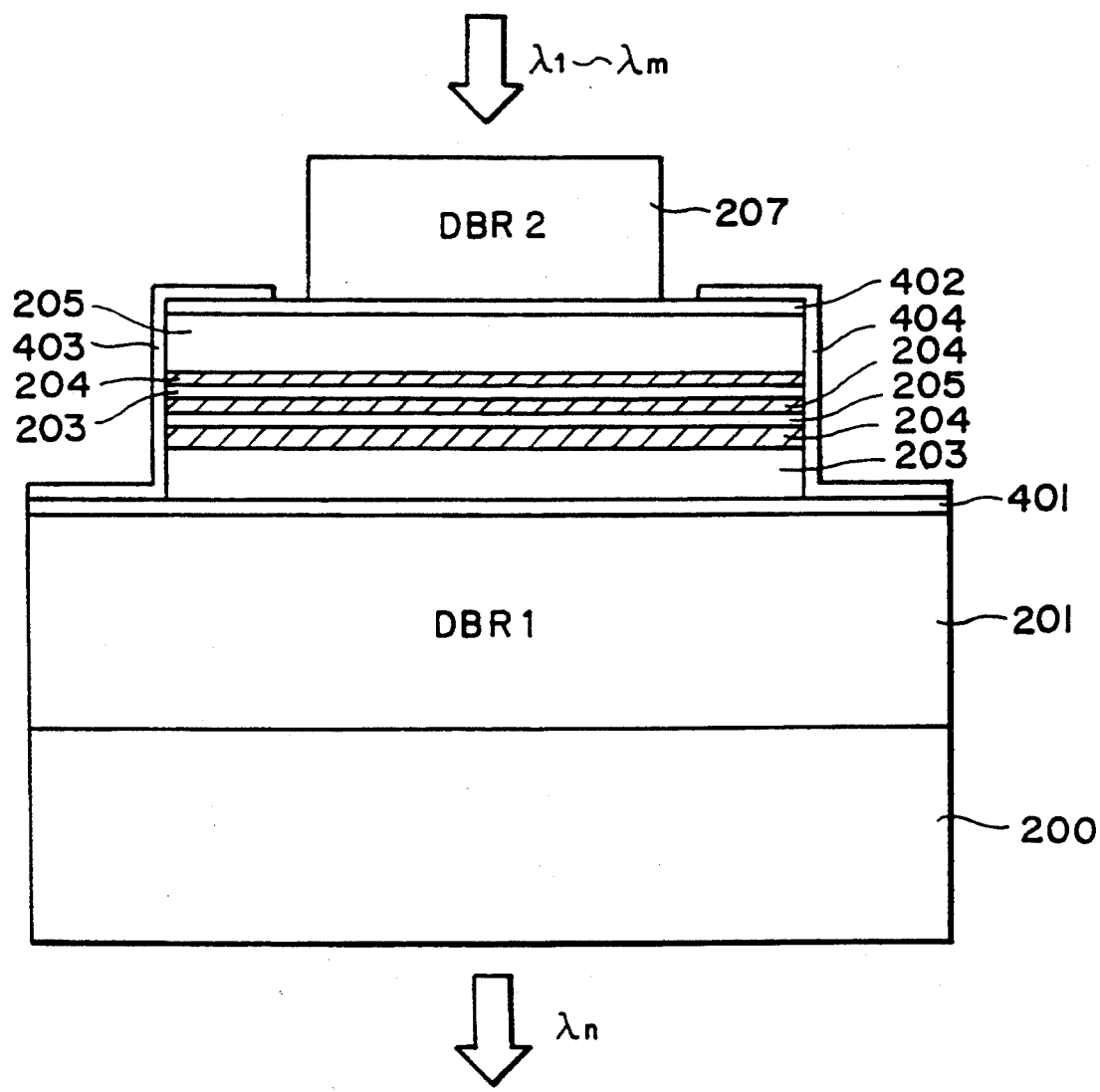

5,424,559

SURFACE EMITTING PHOTONIC SWITCHING STRUCTURE

BACKGROUND OF THE INVENTION (1) Field of the Invention

The present invention relates to a surface emitting photonic switching structure which, upon receiving signal light of various or varied wavelengths, is capable of selecting a desired wavelength therefrom. The structure is such that the signal light is inputted and outputted in a direction of the thickness of the structure, thereby allowing it to be two-dimensionally integrated and making it to be adapted to photonic switching and optical information processing utilizing wavelength multiplexed signals.

(2) Description of the Related Art

A photonic switching which is equipped with wavelength-division switching function and which has been known is shown in FIG. 1. This has been reported by M. Nishio et al. in Photonic Switching Topical Meeting, Salt Lake City, Utah (March, 1991) pp. 246–249 under the title "High-speed Wavelength Switching Experiment for Wavelength-Division and Time-Division Hybrid Switching Networks using LiNbO3 Fabry-Perot Tunable Wavelength Filters". This structure uses X-cut LiNbO3 substrate 10 and the waveguide length (cavity length) is set at 1 mm. Both the facets are coated with anti-reflection coatings 11 and 12. Anti-reflection coated cleaved-ended single fibers 13 and 14 are coupled with an optical waveguide 15. The transmission wavelength tuning is accomplished by changing the refractive index of the Fabry-Perot resonator with control voltages Vc applied across electrodes. FIG. 2 shows the measured wavelength and transmission ratio. In this example, the voltage of 50V applied results in a resonance wavelength shift of 3 Angstroms. The exemplified structure is one in which the light enters laterally, and no examples have been reported which relate to a surface emitting type and which enable the two-dimensional integration.

The problems in the conventional examples described above reside not only in the impossibility of two-dimensional integration but also in the necessity of increasing the element length and of applying such a high operating voltage as 50V. The element length becomes long because the element is cut out from the bulk LiNbO3 and thus the need of the length being about 1 mm is inevitable. Also, for tuning the refractive index of the Fabry-Perot resonator, use is made of the electrical-optical characteristics of LiNbO3, and this mechanism unavoidably leads to the need of using a high operating voltage as described above.

SUMMARY OF THE INVENTION

An object of the invention, therefore, is to overcome the problems existing in the prior art and to provide an improved surface emitting photonic switching structure.

According to one aspect of the invention, there is provided a surface emitting photonic switching structure comprising:

a semiconductor substrate;

a first semiconductor multi-layer film mirror (DBR1) provided on the semiconductor substrate;

an intermediate semiconductor structure provided on the first semiconductor multi-layer film mirror (DBR1) and having pn junctions, the intermediate semiconductor structure including an InGaAs layer having a bandgap wavelength of $\lambda$;

a second semiconductor multi-layer film mirror (DBR2) provided on the intermediate semiconductor structure; and a pair of electrodes for applying reverse bias voltages to the pn junctions, provided to the intermediate semiconductor structure, the pn junctions in the intermediate semiconductor structure being applied with the reverse bias voltages for hanging effective optical length of the intermediate semiconductor structure so as to change transmission wavelength of light incident on one of the second multi-layer film mirror and the first multi-layer film mirror.

The invention provides a surface emitting photonic switching structure which can be two-dimensionally integrated and is compact and is capable of operating with low voltages and in which desired wavelengths can be selected by changing voltages applied thereto. More specifically, the intermediate layer having a pn junction is sandwiched between the first Distributed Bragg Reflector (DBR1) and the second Distributed Bragg Reflector (DBR2) and, by applying a reverse bias voltage, the effective optical length of the intermediate layer is changed. This enables to effect selective changes in the transmission wavelengths.

BRIEF DESCRIPTION OF THE DRAWINGS

The above and other objects, features and advantages of the present invention will be apparent from the following description of preferred embodiments of the invention explained with reference to the accompanying drawings, in which:

FIG. 5 is a diagram showing a structure of a second embodiment according to the invention; and FIG. 6 is a diagram showing a structure of a third embodiment according to the invention.

PREFERRED EMBODIMENTS OF THE INVENTION

Now, preferred embodiments of the invention are explained with reference to the drawings.

Figure 1:
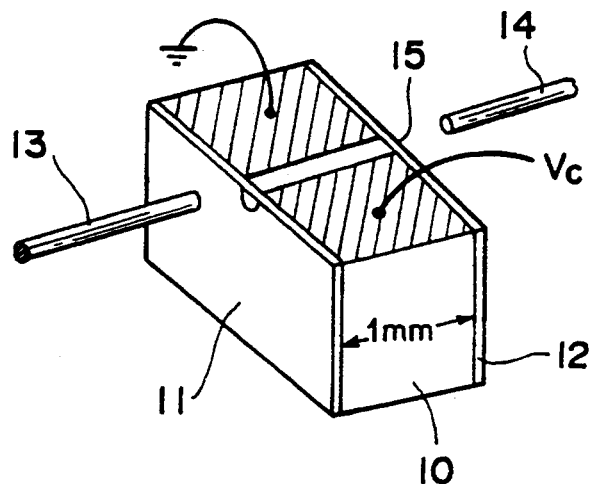
FIG. 1 is a diagrammatic perspective view of a conventional photonic switching which is equipped with wave-length-division switching function.
Figure 2:
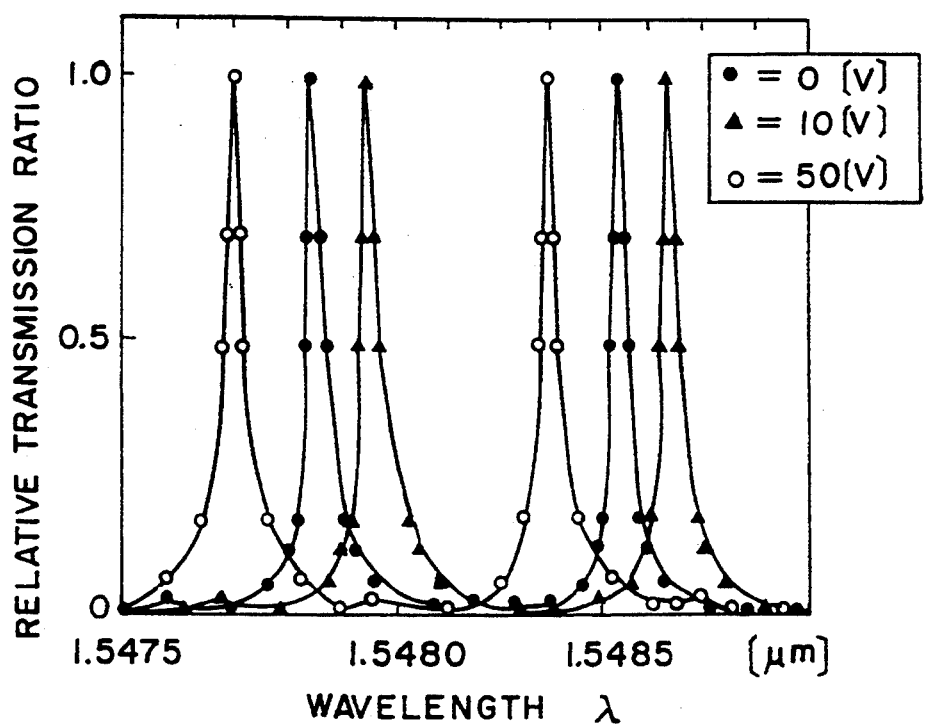
FIG. 2 is a diagram showing the measured wavelength and transmission ratio.
Figure 3A:
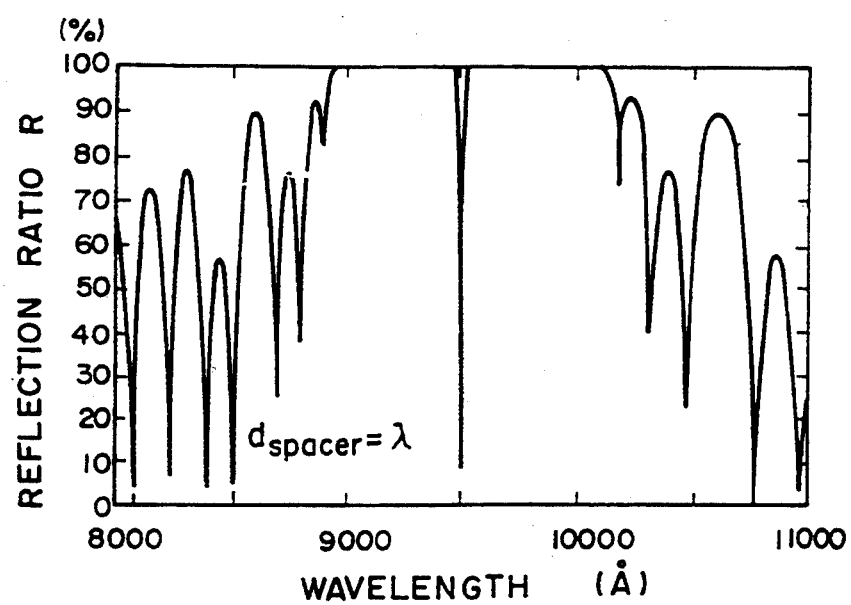
FIGS. 3A, 3B and 3C are reflectance diagrams for explaining a part of the theory of the invention.
Figure 3B:
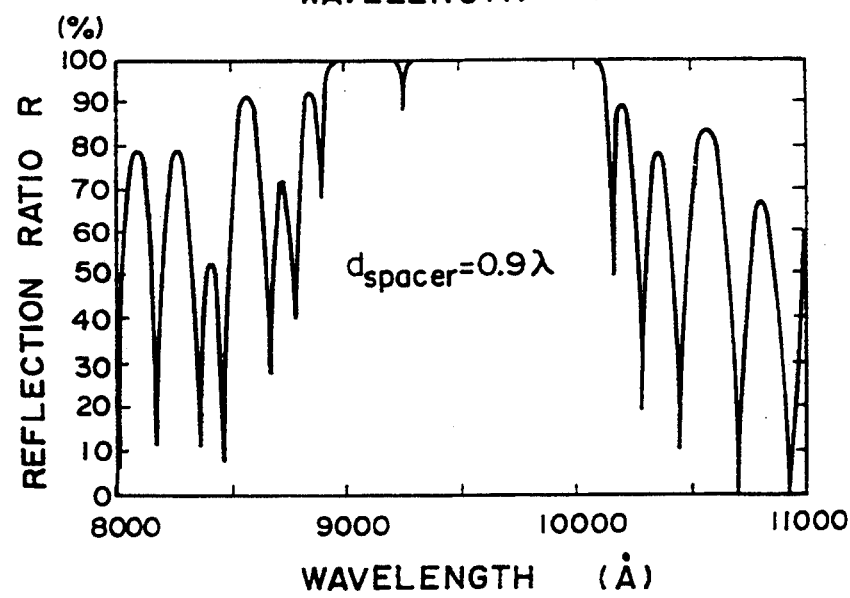
Figure 3C:
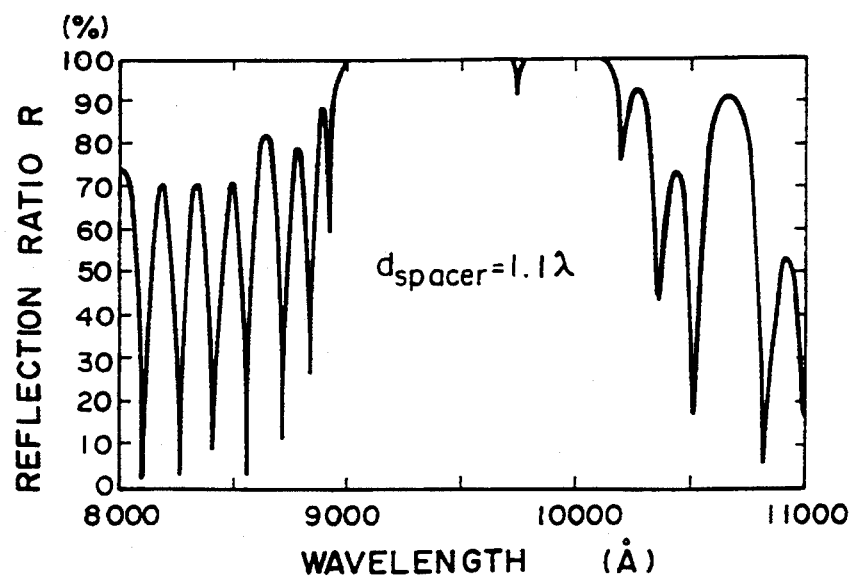
Figure 4:
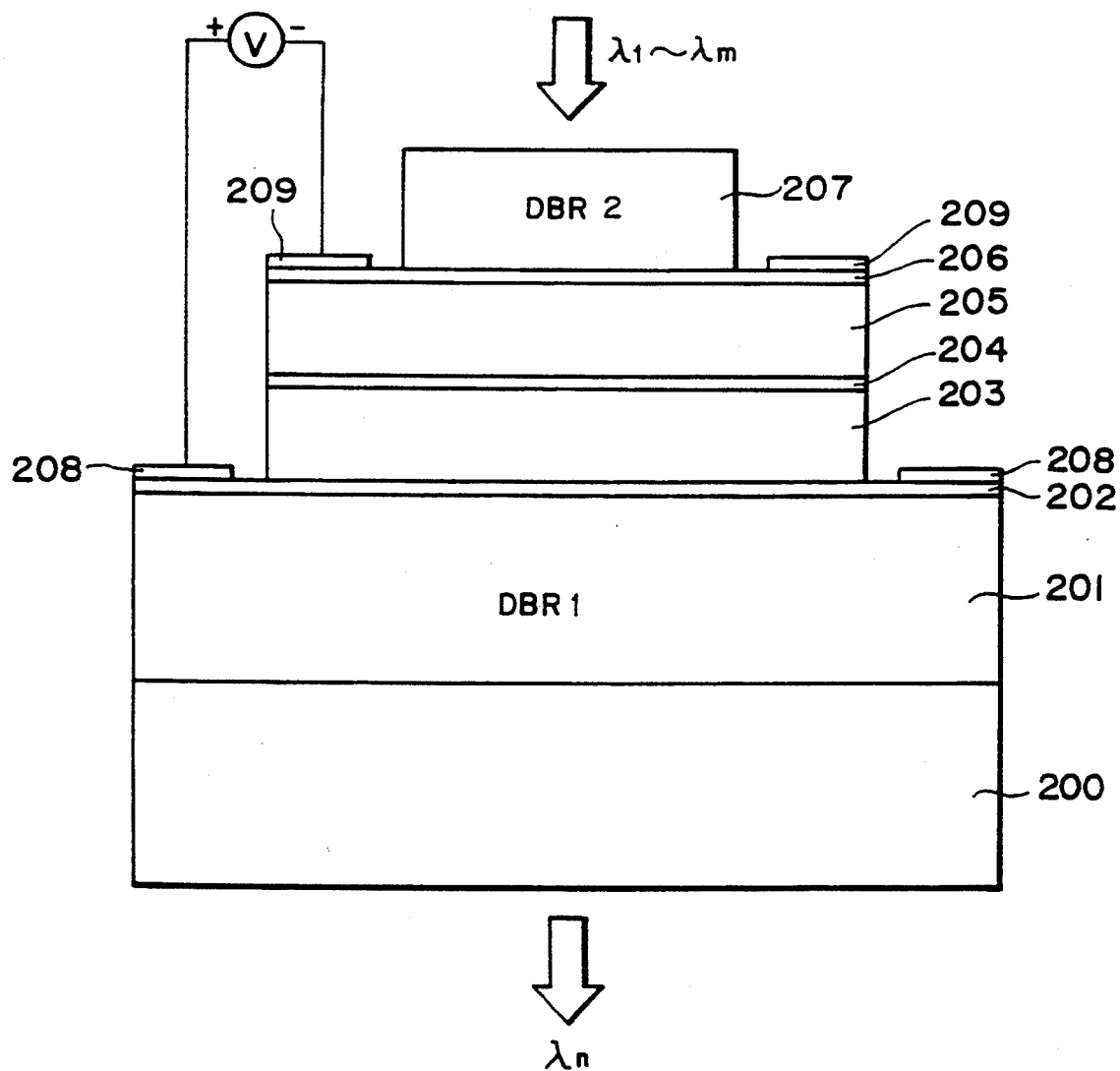
FIG. 4 is a diagram showing a structure of a first embodiment according to the invention.

FIGS. 3A, 3B and 3C which show a relation between reflectance and wavelength are for explaining a part of the theory of the invention. As shown in FIG. 4, the structure is comprised of a semiconductor multi-layer film reflecting mirror or DBR1 (Distributed Bragg Reflector) 201, an intermediate layer and a DBR2 207 which are formed on a GaAs semiconductor substrate 200. Light is incident on the DBR2 at the top. FIGS. 3A–3C show the reflectance versus incident light calculated. It is seen how the reflectance $\underline{R}$ varies with wavelengths in cases where the thickness of the intermediate layer ($= d_{spacer}$) is resonance wavelength $\lambda$ within a medium of the DBR (FIG. 3A), is 0.9$\lambda$ (FIG. 3B), and is 1.1$\lambda$ (FIG. 3C). Specifically, the DBR1 comprises 24.5 pairs of AlAs/GaAs alternating multi-layer films, in which each film has a thickness of $\frac{1}{4}\lambda$. The intermediate layer includes an InGaAs layer 204 (300 Angstrom thick) and $Al_{0.25}Ga_{0.75}As$ layers 203 and 205 sandwiching the InGaAs layer 204 therebetween. The DBR2 comprises 15 pairs of AlAs/GaAs alternating multi-layer films in which each film has a thickness of $\frac{1}{4}\lambda$. According to this calculation, the wavelength $\lambda$ is set to the bandgap wavelength (up to 950 nm) of the InGaAs layer 204.

As is noted from FIGS. 3A–3C, when the thickness of the intermediate layer increases from $0.9\lambda$ to $1.1\lambda$, the dip in the reflectance observed in proximity to a center portion of the reflectance diagram shifts about 500 Angstroms. This calculation is based on the optical absorption coefficient of the InGaAs layer as being 100 $cm^{-1}$. However, if the calculation is made with such value as being zero, that is, transparent, the depth of the dip becomes constant. Also, at this point of the wavelength, the incident light is transmitted at an opposite side (at the DBR1 side) and the incident light in wavelength regions at both sides is nearly 100% reflected without being transmitted. Thus, it can be appreciated that, by utilizing the above characteristics of the structure, if the transmission wavelength can be changed with the position of the dip being made movable or variable by the application of bias voltages, it is possible to realize a surface emitting photonic switching. In order to make the transmission wavelength variable by the voltage being applied, the structure employs the intermediate layer having pn junctions to which voltages are applied. This enables to change the refractive indices and, since the effective thicknesses of the intermediate layer can thus be changed, the transmission wavelengths are made variable. In such structure, the height of the element can only be up to the order of $\lambda$, the size thereof can be considerably reduced from that of the prior art. Also, theoretically, the operating voltage can be made very small, such as several volts.

FIG. 4 diagrammatically shows a structure of a first embodiment according to the invention. A DBR1 201 is formed on a semiconductor GaAs substrate 200. The DBR1 comprises 24.5 pairs of alternating AlAs/GaAs multi-layer films in which each film has a thickness of $\frac{1}{4}\lambda$. Here, the thickness $\lambda$ has a bandgap wavelength (up to 950 nm) of the InGaAs layer. The AlAs/GaAs alternating multi-layer films are undoped. The intermediate layer is formed by sequentially laminating an n-type contact layer 202 of n-GaAs (doping concentration $3 \times 10^{18}$ $cm^{-3}$), an $n-Al_{0.25}Ga_{0.75}As$ layer 203 ($2 \times 10^{18}$ $cm^{-3}$), an InGaAs layer 204 (thickness 300 Angstroms), a $p-Al_{0.25}Ga_{0.75}As$ layer 205 ($2 \times 10^{18}$ $cm^{-3}$), and a p-type contact layer 206 of p-GaAs (doping concentration $1 \times 10^{19}$ $cm^{-3}$). The thickness of the intermediate layer is $\lambda$. The DBR 207 comprises 15 pairs of undoped AlAs/GaAs alternating multi-layer films in which each film has a thickness of $\frac{1}{4}\lambda$. An n-side electrode 208 is in AuGe-Ni/Au and a p-side electrode 209 is in Cr-Au. The element is in a circular-shape when seen from the top and the diameter of the intermediate layer is 30 micrometers. A reverse bias voltage up to 1V is applied between the two electrodes. By applying such bias voltage between the electrodes, the value of refractive index coefficient in the proximity to the band ends of the InGaAs layer 204 increases by up to 1%. The amount of this increase is dependent on wavelengths. As for a side of longer wavelength than that of the band end, such increase in the amount over 100 Angstroms exists at this longer wavelength side. Thus, it can be appreciated from FIGS. 3A–3C that the peak of the transmission wavelength shifts to the longer wavelength side by about 250 Angstroms.

FIG. 5 diagrammatically shows a structure of a second embodiment according to the invention. The width of the transmission wavelength in the first embodiment is about 1 Angstrom and, although the peak of the transmission wavelength can of course be finely adjusted by the applied voltages, it is desirable that the transmission wavelength be still wider in some cases. For example, where a plurality of wavelengths are used, the use is facilitated if there are wider intervals among them. If the intervals are narrow, it becomes necessary to severely control the wavelengths by means of such as temperature control at a light source. However, in the case where the intervals are wider, it is desirable for the width of transmission wavelength of surface emitting photonic switching to be somewhat wider. The reason is that, if such width is wider, the light is transmitted with no problem even when there are some variations in the wavelength of the incident light to be filtered. The second embodiment of the invention aims at providing a structure having wider width of transmission wavelength. The difference in the structure of this embodiment compared with that shown in FIG. 4 is that, in this embodiment, the thickness of the single AlAs 304 layer existing within the DBR1 201 is $\frac{1}{2}\lambda$. This enables to widen the width of the transmission wavelength. In the structure shown in FIG. 5, among the 24.5 pairs of AlAs/AaAs alternating multi-layer films in the DBR1 201, 5 pairs are formed under the AlAs layer 304 and 19 pairs are formed thereabove. This enables to widen the width of the transmission wavelength from 1 Angstrom to 10 Angstroms.

FIG. 6 diagrammatically shows a structure of a third embodiment according to the invention. The difference therein from the structure of the first embodiment resides in the intermediate layer and electrode structures. Where the region whose refractive index change by the application of voltages is expanded in the thickness direction of the layer, it is made possible to increase the effects as to refractive index change three times as compared with those in the first embodiment.

In the structure of the third embodiment shown in FIG. 6, the intermediate layer comprises an undoped $Al_{0.4}Ga_{0.6}As$ layer 401, an $n-Al_{0.25}Ga_{0.75}As$ layer 203 (doping concentration $2 \times 10^{18}$ $cm^{-3}$), an InGaAs layer 204 (thickness 300 Angstroms), a $p-Al_{0.25}Ga_{0.75}As$ layer 205 ($2 \times 10^{18}$ $cm^{-3}$), an InGaAs layer 204 (thickness 300 Angstroms), an $n-Al_{0.25}Ga_{0.75}As$ layer 203 ($2 \times 10^{18}$ $cm^{-3}$), an InGaAs layer 204 (thickness 300 Angstroms), a $p-Al_{0.25}Ga_{0.75}As$ layer 205 ($2 \times 10^{18}$ $cm^{-3}$), and an undoped $Al_{0.4}Ga_{0.6}As$ layer 402. The $Al_{0.4}Ga_{0.6}As$ layers 401 and 402 become high resistance. The electrode 403 is the n-side electrode of AuSn and the electrode 404 is the p-side electrode of AuZn and, in this way, the n-side electrode and the p-side electrode can be brought into contact with the n-type layers and the p-type layers, respectively, in the intermediate layers.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A surface emitting photonic switching structure comprising:

a semiconductor substrate;

a first semiconductor multi-layer film mirror (DBR1) provided on said semiconductor substrate;

an intermediate semiconductor structure provided on said first semiconductor multi-layer film mirror (DBR1) and having pn junctions, said intermediate semiconductor structure including an InGaAs layer having a bandgap wavelength of $\lambda$;

a second semiconductor multi-layer film mirror (DBR2) provided on said intermediate semiconductor structure; and a pair of electrodes for applying reverse bias voltages to said pn junctions, provided to said intermediate semiconductor structure, said pn junctions in said intermediate semiconductor structure being applied with said reverse bias voltages for changing effective optical length of said intermediate semiconductor structure so as to change transmission wavelength of light incident on one of said second multi-layer film mirror and said first multi-layer film mirror.

2. A surface emitting photonic switching structure according to claim 1, in which said second semiconductor multi-layer film mirror (DBR2) comprises a plurality of pairs of undoped AlAs/GaAs alternating multi-layer films each having a thickness of $\frac{1}{4}\lambda$.

3. A surface emitting photonic switching structure according to claim 1, in which said second semiconductor multi-layer film mirror (DBR2) comprises 15 pairs of undoped AlAs/GaAs alternating multi-layer films each having a thickness of $\frac{1}{4}\lambda$.

4. A surface emitting photonic switching structure according to claim 1, in which said first semiconductor multi-layer film mirror (DBR1) comprises a plurality of pairs of undoped AlAs/GaAs alternating multi-layer films each having a thickness of $\frac{1}{4}\lambda$.

5. A surface emitting photonic switching structure according to claim 1, in which said first semiconductor multi-layer film mirror (DBR1) comprises 24.5 pairs of undoped AlAs/GaAs alternating multi-layer films each having a thickness of $\frac{1}{4}\lambda$.

6. A surface emitting photonic switching structure according to claim 1, in which said first semiconductor multi-layer film mirror includes an AlAs layer whose thickness is $\frac{1}{2}\lambda$.

7. A surface emitting photonic switching structure according to claim 6, in which said first semiconductor multi-layer film mirror comprises 24.5 pairs of AlAs/GaAs alternating multi-layer films of which 5 pairs are formed under said AlAs layer and 19 pairs are formed thereabove.

8. A surface emitting photonic switching structure according to claim 1, in which said intermediate semiconductor structure comprises a first undoped $Al_{0.4}Ga_{0.6}As$ layer, a first n-$Al_{0.25}Ga_{0.75}As$ layer, a first InGaAs layer, a first p-$Al_{0.25}Ga_{0.75}As$ layer, a second InGaAs layer, a second n-$Al_{0.25}Ga_{0.75}As$ layer, a third InGaAs layer, a second p-$Al_{0.25}Ga_{0.75}As$ layer, and a second undoped $Al_{0.4}Ga_{0.6}As$ layer, and in which one of said pair of electrodes is an n-side electrode of AuSn in contact with said first and second n-$Al_{0.25}Ga_{0.75}As$ layers, and the other is a p-side electrode of AuZn in contact with said first and second p-$Al_{0.25}Ga_{0.75}As$ layers in said intermediate structure.

* * * * *